US012414202B2

(12) United States Patent
Kaur

(10) Patent No.: US 12,414,202 B2
(45) Date of Patent: *Sep. 9, 2025

(54) METHODS AND SYSTEMS FOR SWITCHING BETWEEN SERVICE PROVIDER NETWORKS

(71) Applicant: Comcast Cable Communications, LLC, Philadelphia, PA (US)

(72) Inventor: Samian Kaur, Plymouth Meeting, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,986

(22) Filed: Apr. 24, 2024

(65) Prior Publication Data
US 2024/0422863 A1 Dec. 19, 2024

Related U.S. Application Data

(63) Continuation of application No. 18/183,577, filed on Mar. 14, 2023, now Pat. No. 11,997,762, which is a
(Continued)

(51) Int. Cl.
*H04W 12/45* (2021.01)
*H04W 8/18* (2009.01)
(Continued)

(52) U.S. Cl.
CPC .......... *H04W 88/06* (2013.01); *H04W 8/183* (2013.01); *H04W 12/45* (2021.01);
(Continued)

(58) Field of Classification Search
CPC ....... H04W 88/06; H04W 8/18; H04W 12/45; H04W 36/14; H04W 36/36; H04W 68/02; H04W 76/15
See application file for complete search history.

(56) References Cited

U.S. PATENT DOCUMENTS 7,047,037 B2 * 5/2006 Ormson ............... H04W 36/302
455/434
7,486,967 B2 2/2009 Pan et al.
(Continued)

FOREIGN PATENT DOCUMENTS

WO WO-2015171246 A1 * 11/2015 ............ H04W 48/18

OTHER PUBLICATIONS

U.S. Appl. No. 18/183,577 (U.S. Pat. No. 11,997,762), filed Mar. 14, 2023 (May 28, 2024), Samian Kaur (Comcast Communications, LLC).
(Continued)

*Primary Examiner* — Hai V Nguyen
(74) *Attorney, Agent, or Firm* — Ballard Spahr LLP

(57) ABSTRACT

A user device (e.g., a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) may dynamically determine configurations for preferred and/or offload networks and optimally switch connections between service provider networks.

31 Claims, 6 Drawing Sheets

Related U.S. Application Data continuation of application No. 17/129,610, filed on Dec. 21, 2020, now Pat. No. 11,638,327.

(60) Provisional application No. 62/950,739, filed on Dec. 19, 2019.

(51) Int. Cl.
*H04W 36/14* (2009.01)
*H04W 36/36* (2009.01)
*H04W 68/02* (2009.01)
*H04W 76/15* (2018.01)
*H04W 88/06* (2009.01)

(52) U.S. Cl.
CPC ....... *H04W 36/144* (2023.05); *H04W 36/362* (2023.05); *H04W 68/02* (2013.01); *H04W 76/15* (2018.02)

(56) References Cited

U.S. PATENT DOCUMENTS

| | | | |
|---|---|---|---|
| 7,539,158 B2 | 5/2009 | Pan | |
| 7,548,763 B2 | 6/2009 | Pan | |
| 7,653,414 B2 | 1/2010 | Pan | |
| 7,840,230 B2 | 11/2010 | Pan | |
| 7,855,988 B2 | 12/2010 | Pan | |
| 7,856,233 B2 | 12/2010 | Pan | |
| 7,979,066 B2 | 7/2011 | Pan | |
| 8,036,158 B2 | 10/2011 | Pan et al. | |
| 8,046,420 B2 | 10/2011 | Pan | |
| 8,089,920 B2 | 1/2012 | Pan | |
| 8,107,409 B2 | 1/2012 | Pan | |
| 8,224,322 B2 | 7/2012 | Pan | |
| 8,228,861 B1* | 7/2012 | Nix | H04L 65/1069 370/329 |
| 8,305,980 B1* | 11/2012 | Nix | H04L 65/1069 370/329 |
| 8,310,990 B2 | 11/2012 | Pan | |
| 8,326,286 B2 | 12/2012 | Pan | |
| 8,340,667 B2 | 12/2012 | Pan | |
| 8,359,029 B2 | 1/2013 | Pan | |
| 8,600,406 B2 | 12/2013 | Pan et al. | |
| 8,676,197 B2 | 3/2014 | Pan et al. | |
| 8,688,111 B2 | 4/2014 | Pan | |
| 8,693,955 B2 | 4/2014 | Pan et al. | |
| 8,706,105 B2 | 4/2014 | Pan | |
| 8,744,435 B2 | 6/2014 | Pan | |
| 8,780,804 B2 | 7/2014 | Pan | |
| 8,792,448 B2* | 7/2014 | Nix | H04L 1/0009 370/332 |
| 9,191,980 B2 | 11/2015 | Pan | |
| 9,198,020 B2 | 11/2015 | Pan | |
| 9,204,382 B1* | 12/2015 | Gude | H04W 48/18 |
| 9,215,098 B2 | 12/2015 | Pan | |
| 9,253,622 B2 | 2/2016 | Pan | |
| 9,319,863 B2* | 4/2016 | Peruru | H04W 8/005 |
| 9,332,478 B2 | 5/2016 | Pan | |
| 9,445,385 B2* | 9/2016 | Nayak | H04W 72/56 |
| 9,515,770 B2 | 12/2016 | Pan et al. | |
| 9,755,931 B2 | 9/2017 | Pan | |
| 10,397,897 B2* | 8/2019 | Balasubramaniam | H04W 48/16 |
| 10,547,530 B2 | 1/2020 | Pan | |
| 10,716,019 B1* | 7/2020 | Velusamy | H04W 24/06 |
| 11,638,327 B2* | 4/2023 | Kaur | H04W 36/144 455/552.1 |
| 11,991,525 B2* | 5/2024 | Nimbavikar | H04W 12/08 |
| 11,997,762 B2* | 5/2024 | Kaur | H04W 76/15 |
| 2012/0009943 A1* | 1/2012 | Greenberg | A01K 15/023 455/456.1 |
| 2013/0170471 A1* | 7/2013 | Nix | H04L 1/0026 370/331 |
| 2013/0210421 A1* | 8/2013 | Mohseni | H04L 1/1867 455/423 |
| 2014/0341039 A1* | 11/2014 | Rubin | H04L 1/0026 370/235 |
| 2015/0011236 A1* | 1/2015 | Kazmi | H04W 52/365 455/456.1 |
| 2015/0031408 A1* | 1/2015 | Kalla | H04W 52/367 455/522 |
| 2015/0245309 A1* | 8/2015 | Nayak | H04W 8/183 455/435.3 |
| 2015/0282059 A1* | 10/2015 | Nayak | H04W 48/18 455/452.1 |
| 2015/0296364 A1* | 10/2015 | Peruru | H04W 88/06 455/434 |
| 2015/0327159 A1* | 11/2015 | Gude | H04W 48/18 455/434 |
| 2016/0037329 A1* | 2/2016 | Chong | G09G 3/3291 455/422.1 |
| 2016/0050686 A1* | 2/2016 | Krishnamoorthi | H04W 28/04 455/418 |
| 2016/0134316 A1* | 5/2016 | Mohan | H04B 1/3816 455/558 |
| 2016/0191375 A1* | 6/2016 | Gopala Krishnan | H04L 1/1877 370/217 |
| 2016/0255639 A1* | 9/2016 | Chen | H04W 72/542 370/336 |
| 2017/0006530 A1* | 1/2017 | Shi | H04W 36/0085 |
| 2017/0280380 A1* | 9/2017 | Gundu | H04B 1/3816 |
| 2018/0288732 A1* | 10/2018 | Balasubramaniam | H04W 76/19 |
| 2019/0124575 A1* | 4/2019 | Long | H04W 60/005 |
| 2020/0134151 A1* | 4/2020 | Magi | G06F 21/32 |
| 2020/0205062 A1* | 6/2020 | Azizi | H04W 4/46 |
| 2020/0344019 A1* | 10/2020 | Da Silva | H04L 1/203 |
| 2021/0022209 A1* | 1/2021 | Singh | H04W 8/183 |
| 2021/0027710 A1* | 1/2021 | Chong | H04W 8/183 |
| 2021/0114616 A1* | 4/2021 | Altman | H04W 76/15 |
| 2021/0195686 A1* | 6/2021 | Kaur | H04W 36/144 |
| 2022/0015165 A1* | 1/2022 | Han | H04L 65/1104 |

OTHER PUBLICATIONS

U.S. Appl. No. 17/129,610 (U.S. Pat. No. 11,638,327), filed Dec. 21, 2020 (Apr. 25, 2023), Samian Kaur (Comcast Cable Communications, LLC).

* cited by examiner

METHODS AND SYSTEMS FOR SWITCHING BETWEEN SERVICE PROVIDER NETWORKS

CROSS-REFERENCE TO RELATED PATENT APPLICATION

This application is a continuation of U.S. application Ser. No. 18/183,577, filed Mar. 14, 2023, which is a continuation of U.S. application Ser. No. 17/129,610, filed Dec. 21, 2020, now U.S. Pat. No. 11,638,327, which claims the benefit of U.S. Provisional Application No. 62/950,739 filed Dec. 19, 2019, herein incorporated by reference in their entireties.

BACKGROUND

A user device (e.g., a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) may be associated with different network subscriptions that enable the user device to switch between networks owned/maintained by different service providers. The user device is unable to determine when switching to a particular network may degrade a user experience due to congestion, errors, and/or other issues of the switched to network. Each time the user device scans for a network to switch to creates gaps in data reception that degrade the user experience. Switching between networks drains the power and related resources of the user device.

SUMMARY

It is to be understood that both the following general description and the following detailed description are exemplary and explanatory only and are not restrictive. Methods and systems for switching between service provider networks are described. A user device (e.g., a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) may avoid interrupting and/or degrading a user experience (e.g., a perceived quality of a voice and/or data communication, etc.) by monitoring traffic patterns within a network, and taking advantage of opportunities to switch to another network when the user experience may be least impacted.

The user device may intermittently determine the status and/or condition of a preferred service provider network and/or an offload service provider network, and use handover (e.g., hand-in, hand-out, etc.) criteria, conditions (e.g., network conditions, device-based-conditions, etc.) and/or configurations (e.g., preset device configurations, service provider-specific configurations, original equipment manufacturer (OEM) configurations, etc.) to determine when to switch between the networks without affecting a user experience. For example, a user device connected to and/or in communication with a mobile network operator (MNO) may switch the connection and/or communication to a multi-system operator (MSO) network based on different handover (e.g., hand-in, hand-out, etc.) criteria, conditions, and/or configurations. The user device may use coverage based measurement criteria (e.g., service/communication provider signal detection, etc.), network/provider conditions/settings (e.g., congestion, data/user overload, device class preference, traffic conditions, etc.), and/or device-based conditions (e.g., operational status, rate of movement, or any other criteria, and/or conditions to determine when to transitions from a network associated with a subscription/service/provider to a network associated with a different subscription/service/provider.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
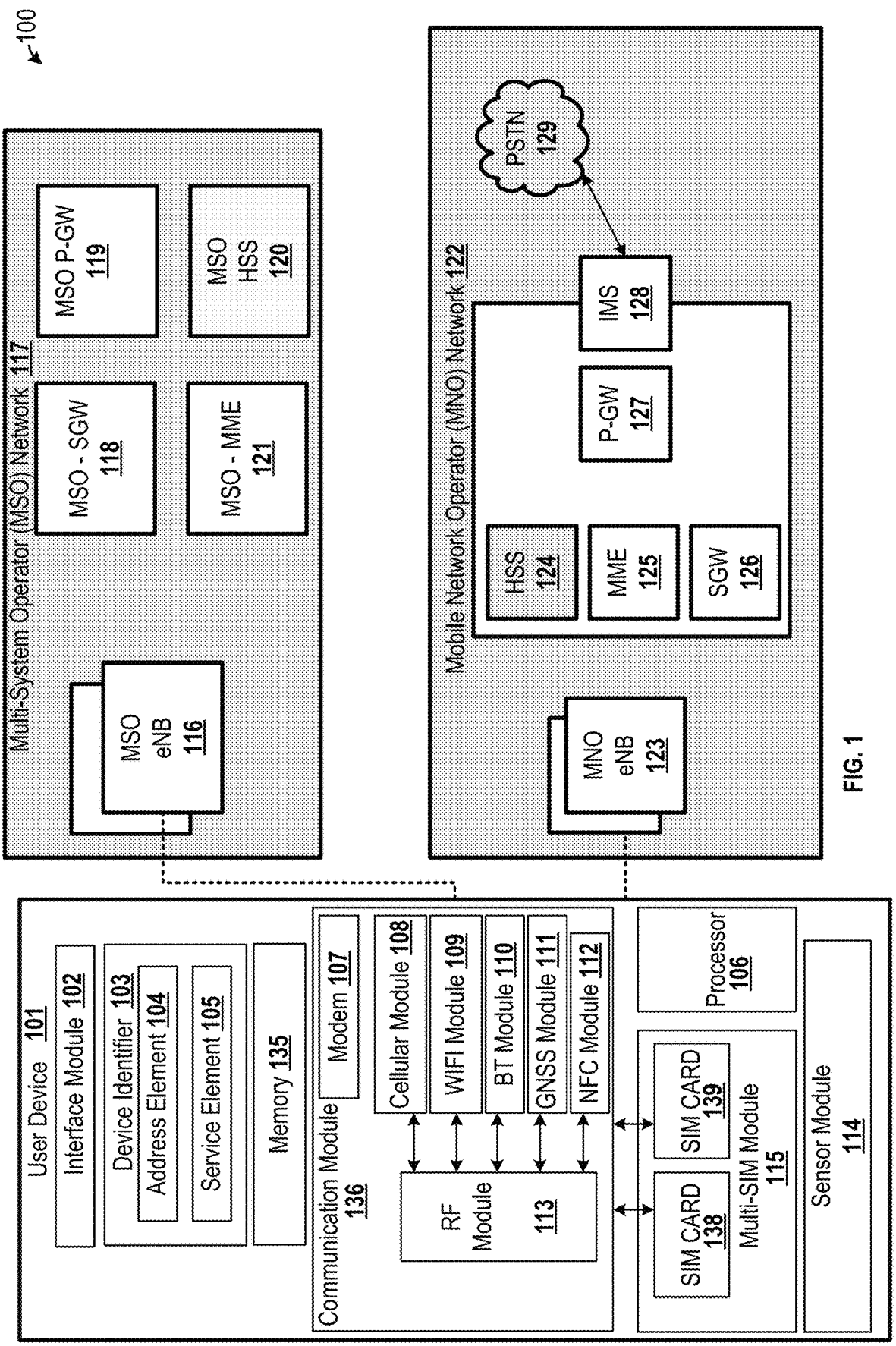
FIG. 1 shows a system for switching between service provider networks.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

A preferred network may be any network that a user device (e.g., a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) is configured/provisioned to use as a primary connection and/or communication service for a type of service/data. An offload network may be any network that a user device is configured/provisioned to use as a secondary connection and/or communication service for a different type of service/data. For example, a primary connection and/or communication service may be include any connection and/or communication that a mobile/smart phone (or any other user device) uses to communicate voice service/data, cellular service/data, and/or the like, and a secondary connection and/or communication service may be include any connection and/or communication service the mobile/smart phone (or any other user device) uses to communicate multimedia service/data, Internet service/data, and/or the like. The mobile/smart phone (or any other user device) may be configured to use a cellular network as a primary connection and/or communication service for sending/receiving voice data and may be configured to use a packet-switched and/or circuit-switched network as a secondary connection for sending/receiving multimedia data. The mobile/smart phone (or any other user device) may determine opportunities to ignore/change network (preferred/primary network and/or offload/secondary network) selection configurations and/or presets. The mobile/smart phone may ignore/change the network) selection configurations and/or presets when/if switching to a network would cause a degraded user experience. For example, a user experience may be degraded if a network the user device switches/connects to is experiencing congestion, errors, latency, or any other network issues.

The user device may determine/adjust its configurations for preferred and/or offload networks and switch connections between service provider networks. For example, the user device, when connected to and/or in communication with a mobile network operator (MNO) network, may switch the connection and/or communication to a multi-system operator (MSO) network. The switch may be based on different handover (e.g., hand-in, hand-out, etc.) criteria (e.g., one or more signals received and/or not received, etc.), conditions (e.g., network conditions, device-based-conditions, etc.), and/or configurations (e.g., preset device configurations, service provider-specific configurations, original equipment manufacturer (OEM) configurations, etc.). For example, the user device may use coverage based measurement criteria (e.g., service/communication provider signal detection, etc.), network/provider conditions/settings (e.g., congestion, data/user overload, device class preference, traffic conditions, etc.), and/or device-based conditions (e.g., operational status, rate of movement, or any other criteria, and/or conditions to determine when to transitions from a network associated with a subscription/service/provider to a network associated with a different subscription/service/provider.

FIG. 1 shows a system 100 for switching between service provider networks. The system 100 may be configured to provide services, such as wireless communication services, to a user device 101 (e.g., a mobile phone, user equipment (UE), a dual subscriber identity module (SIM) dual standby (DSDS) device, a multi-SIM multi-standby device (MSMS) device, a mobile device, a smart device, laptop, tablet, computing device, etc.). A DSDS and/or multi-SIM configuration of the user device 101 may enable the user device 101 to connect to (e.g., attach, etc.) and/or be in communication with networks provided by, supported, by, and/or maintained by different service providers, such as a multi-system operator (MSO) network 117 and a mobile network operator (MNO) network 122. The user device may be configured to manage connections with and communications to the MSO network 117, the MNO network 123, or any other network-based, in part, on preferred network settings of the user device 101.

The multi-system operator (MSO) network 117 may include multiple base stations (e.g., network devices, relays, access points, etc.), such as an MSO eNb 116. The MSO eNb 116 may be a fixed point of communication used to maintain a connection/communication with multiple user devices (e.g., the user device 101, etc.), and/or facilitate device paging services within the MSO network 117. The MSO eNb 116 may be connected to an antenna (or multiple antennae) that receives and transmits signals (e.g., cellular signals, etc.) within the MSO network 117 to multiple user devices (e.g., the user device 101, etc.). The MSO eNb 116 may extend a service provider network (e.g., the MSO network 117, etc.) by blocks or by miles. The MSO eNb 116 may implement media access control (MAC), physical, radio link control (RLC), and packet data control protocol (PDCP) layers, and offer radio resource control (RRC), admission, QOS (Quality of Service), and other such functionalities within the MSO network 117.

The multi-system operator (MSO) network 117 may include an MSO mobility management entity (MME) 121. The MSO-MME 121 may serve as a primary management element for access to the MSO network 117. The MSO-MME 121 may be responsible for all the procedures (authentication, encryption, signaling, mobility, etc.) relative to the user device 101. The MSO-MME 121 may serve as a control node for the MSO network 117. The MSO-MME 121 may be responsible for tracking and paging procedures associated with the user device 101, including retransmissions. The MSO-MME 121 may manage/facilitate a bearer activation/deactivation process and may be responsible for choosing a serving gateway (SGW), such as the MSO-SGW 118, for the user device 101 when the user device 101 initially connects (e.g., an initial attach, etc.) to the MSO network 117 and at time of an intra-base station handover. The MSO-SGW 118 may route and/or forward data packets sent by the user device 101, and may also serve as a mobility anchor for the user device 101 during inter-base station handovers and/or communication technology changes (e.g., data vs. voice, etc.). When the user device 101 is in an idle state, the MSO-SGW 118 may terminate the downlink data path and trigger paging when downlink data arrives for the user device 101. The MSO-SGW 118 may manage and store user device 101 contexts, such as parameters of an internet protocol (IP) bearer service, and/or network internal routing information. The MSO-SGW 118 may replicate user traffic associated with the user device 101 in case of lawful interception.

The MSO-MME 121 may authenticate the user device 101 for the MSO network 117 based on by interacting with an MSO home subscriber server (HSS) 120. The MSO-HSS 120 may store/manage subscription-related information (e.g., subscriber profiles, etc.), perform authentication and authorization of the user device 101, and provide location and IP information associated with the user device 101 whenever the user device 101 is connected/attached to the MSO network 117. An MSO packet-data network gateway (P-GW) 119 may provide connectivity from the user device 101 to one or more external packet data networks, by serving as a point of exit and entry of traffic for the user device 101.

The mobile network operator (MNO) network 122 may include multiple base stations (e.g., network devices, relays, access points, etc.), such as an MNO eNb 123. The MNO eNb 123 may be a fixed point of communication used to maintain a connection/communication with multiple user devices (e.g., the user device 101, etc.), and/or facilitate device paging services within the MNO network 122. The MNO eNb 123 may be connected to an antenna (or multiple antennae) that receives and transmits signals (e.g., cellular signals, etc.) within the MNO network 122 to multiple user devices (e.g., the user device 101, etc.). The MNO eNb 123 may extend a service provider network (e.g., the MNO network 122, etc.) by blocks or by miles. The MNO eNb 123 may implement media access control (MAC), physical, radio link control (RLC), and packet data control protocol (PDCP) layers, and offer radio resource control (RRC), admission, QoS (Quality of Service), and other such functionalities within the MNO network 122.

The mobile network operator (MNO) network 122 may include a mobility management entity (MME) 125. The MME 125 may serve as a primary management element for access to the MNO network 122. The MME 125 may be responsible for all the procedures (authentication, encryption, signaling, mobility, etc.) relative to the user device 101. The MME 125 may serve as a control node for the MNO network 122. The MME 125 may be responsible for tracking and paging procedures associated with the user device 101, including retransmissions. The MME 125 may manage/facilitate a bearer activation/deactivation process and may be responsible for choosing a serving gateway (SGW), such as an SGW 126, for the user device 101 when the user device 101 initially connects (e.g., an initial attach, etc.) to the MNO network 122 and at time of an intra-base station handover. The SGW 126 may route and/or forward data packets sent by the user device 101, and may also serve as a mobility anchor for the user device 101 during inter-base station handovers and/or communication technology changes (e.g., data vs. voice, etc.). When the user device 101 is in an idle state, the SGW 126 may terminate the downlink data path and trigger paging when downlink data arrives for the user device 101. The SGW 126 may manage and store user device 101 contexts, such as parameters of an internet protocol (IP) bearer service, and network internal routing information. The SGW 126 may replicate user traffic associated with the user device 101 in case of lawful interception.

The MME 125 may authenticate the user device 101 for the MNO network 122 based on interacting with a home subscriber server (HSS) 124. The HSS 124 may store/manage subscription-related information (e.g., subscriber profiles, etc.), perform authentication and authorization of the user device 101, and provide location and IP information associated with the user device 101 whenever the user device 101 is connected/attached to the MNO network 122. A packet-data network gateway (P-GW) 127 may provide connectivity from the user device 101 to one or more external packet data networks, by serving as a point of exit and entry of traffic for the user device 101.

The MNO network 122 may be associated with an internet protocol (IP) multimedia subsystem (IMS) 128. The IMS 128 may include an architectural framework for delivering IP multimedia services to devices in communication with the MNO network 122, such as the user device 101. The IMS 128 may be a standalone system that resides out of the MNO network 122 and is connected to P-GW 127 via an SGi interface. The IMS 128 may be in connection/communication with a public switched telephone network (PSTN) 129. The PSTN 129 may include all switched telephone networks around the world that are operated by local, national or international carriers.

The user device 101 may comprise an interface module 102 that provides an interface to a user to interact with the user device 101, another user device, and/or any other device/component of the system 100. The interface module 102 may be any interface for presenting and/or receiving information to/from the user, such as user feedback. An interface may be a communication interface such as a web browser (e.g., Internet Explorer®, Mozilla Firefox®, Google Chrome®, Safari®, or the like). Other software, hardware, and/or interfaces may be used to provide communication between the user and one or more of the user device 101, another user device, and/or any other device/component of the system 100. The interface module 102 may request or query various files from a local source and/or a remote source. The interface module 102 may transmit data to a local or remote device such as another user device, and/or any other device/component of the system 100.

The user device 101 may be associated with a user identifier or device identifier 103. The device identifier 103 may be any identifier, token, character, string, or the like, for differentiating one user or user device (e.g., user device 101) from another user or user device. For example, the device identifier 103 may include an international mobile subscriber identity (IMSI), an international mobile equipment identity (IMEI), a media access control address (MAC address), a mobile device identifier, and/or any other identifier. The device identifier 103 may identify a user or user device as belonging to a particular class of users or user devices. The device identifier 103 may comprise information relating to the user device such as a manufacturer, a model or type of device, a service provider associated with the user device 101, a state of the user device 101, a locator, and/or a label or classifier. Other information may be represented by the device identifier 103.

The device identifier 103 may comprise an address element 104 and a service element 105. The address element 104 may comprise or provide an internet protocol address, a network address, a media access control (MAC) address, an Internet address, or the like. The address element 104 may be relied upon to establish a communication session between the user device 101, another user device, different networks, and/or any other device/component of the system 100. The address element 104 may be used as an identifier or locator of the user device 101. The address element 104 may be persistent for a particular network.

The service element 105 may comprise an identification of a service provider/network (e.g., a primary network, an offload network, the multi-system operator (MSO) network 117, the mobile network operator (MNO) network 122, a communication service provider, a content delivery network, etc.) associated with the user device 101 and/or with the class of user device 101. The class of the user device 101 may be related to a type of device, a capability of a device, type of service being provided, and/or a level of service (e.g., business class, service tier, service package, etc.). The service element 105 may comprise information relating to or provided by a communication service provider (e.g., Internet service provider) that is providing or enabling data flow such as communication services to the user device 101. The service element 105 may comprise information relating to a preferred service provider/network for one or more particular services relating to the user device 101. The address element 104 may be used to identify or retrieve data from the service element 105, or vice versa. The one or more of the address element 104 and the service element 105 may be stored remotely from the user device 101 and retrieved by one or more devices such as the user device 101, another user device, and/or any other device/component of the system 100. Other information may be represented by the service element 105.

The user device 101 may include a memory 135. The memory 135 may store credentials (e.g., identifier information, password information, service provider credentials/information, etc.) associated with the user device 101, another user device, and/or any other device/component of the system 100. The memory 135 may store one or more applications and/or programs (e.g., application programming interface (API), etc.). The memory 135 may store and/or include any data/information. The memory 135 may include an internal memory and/or an external memory. For example, the internal memory may include volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)). The external memory may include, for example, a flash drive, Compact Flash (CF), Secure Digital (SD), Micro Secure Digital (Micro-SD), Mini Secure Digital (Mini-SD), extreme Digital (xD), memory stick, and/or the like. The external memory may be operatively and/or physically connected to the user device 101 via an interface, such as the interface module 102.

The user device 101 may include a communication module 136. The communication module 136 may include a processor (not shown), such as a baseband processor and/or the like, for managing communications between a modem 107, a cellular module 108, a Wi-Fi module 109, a BlueTooth (BT) module 110, a global navigation satellite system (GNSS) module 111 (e.g., a GPS module, a Glonass module, a Beidou module, or a Galileo module), a Near Field Communication (NFC) module 112, and a Radio Frequency (RF) module 113.

The RF module 113 may transmit/receive, for example, a communication signal (e.g., a Radio Frequency (RF) signal). The RF module 113 may include, for example, a transceiver, a Power Amp Module (PAM), a frequency filter, a Low Noise Amplifier (LNA), an antenna, or the like. At least one of the modem 107, the cellular module 108, the WiFi module 109, the Bluetooth (BT) module 110, the GNSS module 111, and the NFC module 112 may transmit/receive an RF signal via a separate RF module. The RF module 113 may receive downlink signals transmitted by a base station (e.g., network device, relay, access point, etc.), such as a base station within a multi-system operator (MSO) network 117 (e.g., MSO eNb 116, etc.) or a base station within a multi-system operator (MSO) network 122 (e.g., MNO eNb 123, etc.) The RF module 113 (e.g., a receiver of the RF module 113) may condition (e.g., filter, amplify, frequency downconvert, digitize, etc.) the received signal and provide/generate input samples. The modem 107 may process (e.g., demodulate) the input samples and provide symbol estimates. The modem 107 may process (e.g., de-interleave, decode, etc.) the symbol estimates and generate/provide decoded data and signaling messages sent to the user device 101. The modem 107 may process received signals in accordance with a radio access technology (RAT) used by a wireless network (e.g., the MSO network 117, the MNO network 123, etc.) with which the user device 101 is in communication. The modem 107 may modulate one or more carrier wave signals, encode digital information for transmission, demodulate signals, and decode information received. The modem 107 may be operable for any mobile telephony system (e.g., GPRS, UMTS, HSPA, EVDO, WiMax, etc.). The modem 107 may communicate with any component of the user device 101, such as the processor 106, the multi-SIM module 115, and/or the like to facilitate and/or manage communications with any component of the system 100. For, example the modem 107 may communicate with any component of the user device 101 to manage, facilitate, and/or assist with communications with a device/component of a service provider and/or carrier network, such as during a handover process/procedure, and/or the like.

The cellular module 108 may provide a voice call, a video call, a text service, an internet service, and/or the like through a communication network (e.g., the MNO network 122, etc.). For example, the cellular module 108 may identify and authenticate the user device 101 in the communication network by using the multi-SIM module 115 (e.g., a Subscriber Identity Module (SIM) card). The cellular module 108 may include a Communication Processor (CP) and may perform at least some functions that may be provided by the processor 106. Each of the modem 107, the cellular module 108, the WiFi module 109, the Bluetooth (BT) module 110, the GNSS module 111, and/or the NFC module 112 may include and/or be associated with, for example, a processor for processing data transmitted/received via a corresponding module. Data/information transmitted/received via the modem 107, the cellular module 108, the WiFi module 109, the Bluetooth (BT) module 110, the GNSS module 111, and/or the NFC module 112 may be processed by a single processor. At least some (e.g., two or more) of the modem 107, the cellular module 108, the WiFi module 109, the Bluetooth (BT) module 110, the GNSS module 111, and the NFC module 112 may be included in a single integrated circuit (IC) or an IC package.

User device 101 may use the communication module 136 to detect/determine the presence of a service provider/network (e.g., a primary network, an offload network, the multi-system operator (MSO) network 117, the mobile network operator (MNO) network 122, a communication service provider, a content delivery network, etc.). For example, the communication module 136 may cause the RF module to tune to different frequencies/amplitudes to detect/determine (e.g., receive, etc.) signals sent/broadcast by a device/component of a service provider/network (e.g., a primary network, an offload network, the multi-system operator (MSO) network 117, the mobile network operator (MNO) network 122, a communication service provider, a content delivery network, etc.).

The user device 101 may include the processor 106. The processor 106 may be implemented, for example, with a System on Chip (SoC), and/or the like. The processor 106 may comprise suitable logic, circuitry, interfaces, and/or code that may be operable to manage/control operations of and/or communicate with components of the user device 101 such as, for example, the communication module 136, the multi-subscriber identification module (SIM) module 115, and/or any other component of the user device 101. The processor 106 may coordinate and/or control operations of the multi-SIM module 115 in response to a SIM card selection from the interface module 102. The processor 106 may include an application processor configured to run a specific application based on an application selection from the interface module 102. The processor 106 may communicate with any component of the user device 101 to manage, facilitate, and/or assist with communications with a service provider and/or carrier, such as during a handover process/procedure, and/or the like.

The processor 106 may be operable to select one or more SIM cards (e.g., SIM card 138, SIM card 139, etc.) associated with the multi-Sim module 115 based on user preferences and/or device configuration. The processor 106 may communicate SIM card selection information to a SIM card controller (not shown) of the multi-Sim module 115 so that the selected one or more SIM cards may be connected to the SIM card (not shown) of the multi-Sim module 115 and thereby to the processor 106 (and/or any other component of the user device 101). The selected SIM cards may be actively connected to the SIM card controller to enable downloading of corresponding SIM identification information into the memory 135 (or any other data/information repository) of the user device 101. SIM identification information associated with (e.g., downloaded from) each of the selected SIM cards (e.g., SIM card 138, SIM card 139, etc.) may be stored and the SIM identification information corresponding to one or more of a plurality of SIM cards of the multi-Sim module 115 (e.g., SIM card 138, SIM card 139, etc.) may be in an active state or a standby state.

The multi-Sim module 115 may include multiple SIM cards (e.g., SIM card 138, SIM card 139, etc.) and/or embedded SIMs, The multi-Sim module 115 may include and/or be associated with unique identification information (e.g., an Integrated Circuit Card Identifier (ICCID)) or subscriber information (e.g., an International Mobile Subscriber Identity (IMSI)).

The user device 101 may include a sensor module 114. The sensor module 114 may measure, for example, a physical quantity or detect an operational status of the user device 101, and may convert the measured or detected information into an electric signal. The sensor module 740 may include, for example, at least one of a gesture sensor, a gyro sensor, a pressure sensor, a magnetic sensor, an acceleration sensor, a grip sensor, a proximity sensor, a color sensor (e.g., a Red, Green, Blue (RGB) sensor), a biosensor, a temperature/humidity sensor, an illumination sensor, an Ultra Violet (UV) sensor, an ultrasonic sensor, and an optical sensor, and/or any other senor. The sensor module 114 may detect/determine power consumption (caused by one or more processes/functions of the user device), and may send data/information regarding the power consumption to any other component of the user device 101, such as the interface module 102, the processor 106, and/or the communication module 136. Data/information regarding the power consumption of the user device 101 (a component of the user device 101) may be used based on a protocol (e.g., a protocol/method for switching between service provider networks, etc.) associated with a communications/connection handover process/procedure between one or more components/devices of a service provider/network (e.g., a primary network, an offload network, the multi-system operator (MSO) network 117, the mobile network operator (MNO) network 122, a communication service provider, a content delivery network, etc.).

The sensor module 114 may communicate with the processor 106 (or any other component of the user device 101) to detect/determine a mobility/operational state of the user device 101. An estimation of the mobility/operational state of the user device may be used to dynamically adjust settings of the user device 101, such as preferred network settings of the user device 101. For example, the user device 101 may be configured to recognize either the MSO network 117 or the MNO network 123 as a preferred network. The user device 101 may be connected to and/or in communication with a non-preferred network and operating at a speed/rate higher than a threshold. The user device 101 (e.g., the processor 106, etc.) may be operating at a speed higher than the threshold because the user device 101 may be in engaged in a process associated with the non-preferred network, such as carrier aggregation, a large data upload/download, a resource taxing communication session (e.g., advanced wireless technology, a fifth-generation (5G) communication session or greater, etc.), and/or the like. To avoid an interruption of the current process of the user device 101 on the non-preferred network caused by an automatic switch to a preferred network, the determination of the mobility/operational state of the user device may cause the user device to adjust the preferred network settings so that the non-preferred network becomes the preferred network (or vice versa). Hysteresis of the mobility/operational state may be used to dynamically adjust the preferred network settings of the user device 101.

The user device 101 may use the sensor module 114 for localization analysis of the user device 101. For example, the user device 101 may determine when it is operating indoors and when it is operating outdoors. The user device 101, based on localization analysis, may dynamically adjust its preferred network settings. For example, the preferred network settings of the user device 101 may be adjusted so that a non-preferred network becomes a preferred network of the user device 101 whenever the user device is indoors and/or within a particular geo-fenced area. The MSO network 117 and the MNO network 123 may both implement different geo-fencing schemes within the respective networks. The user device 101 may detect the presence of a device/component of a network (e.g., the MSO network 117, the MNO network 123, etc.), such as a Wi-Fi access point (or any other device/component), and dynamically adjust its preferred network settings based on the detection. When the user device 101 detects and/or determines the presence of a device/component of a network, the user device 101 may cease scanning for (detecting/determining, etc.) a preferred network regardless of the preferred network settings of the user device 101.

A connection switch of the user device 101 from a first network associated with subscription/service/provider (e.g., the MNO network 122, etc.) to a second network associated with another subscription/service/provider (e.g., the MSO network 117, etc.) may cause the first network (e.g., a base station of the first network, an access point of the first network, etc.) to incorrectly perceive that the user device 101 has moved into a reduced coverage area and/or challenged radio/signal environment of the first network. For example, when a user of the user device 101 is traveling/moving with the user device 101 through a coverage area of the MNO network 122, a reference signal received power (RSRP), reference signal received quality (RSRQ), or any other signal measurement associated with the MNO eNb 123 may be impaired and/or reduced. The MNO eNb 123 may incorrectly perceive that the user device 101 has moved into a reduced coverage area of the MNO network 122, causing the MNO eNb 123 to unnecessarily send increased power ramp-up commands to the user device 101, and/or terminate a connection with the user device 101. To avoid mitigation by the MNO eNb 123 (or any other base station, device, or component of the MNO network 122), the user device 101 may send a signal/information to the MNO eNb 123 (or any other base station, device, or component of the MNO network 122) to extend a time window within which the MNO eNb 123 attempts to determine the presence of the user device 101. During the extended time window, the MNO eNb 123 may deactivate any virtual connection between the user device 101 and the P-GW 127. The deactivation of the virtual connections may be for a predetermined duration.

When the user device detects and/or determines the presence of the MNO network 123 or the MSO network 117 (based on signals sent/broadcast by the MNO eNb 123 and the MSO eNb 116, respectively) the user device 101 may avoid interruptions in its communications (e.g., data communications, voice communications, etc.) caused by failed attempts to switch to either network. For example, the user device may be configured to recognize the MSO network 117 as a preferred network, and thus may attempt to switch/connect to the MSO network 117 whenever the presence of the MSO network 117 is detected/determined. The MSO network 117 may be congested, overloaded, and/or experiencing any other network condition. Therefore the user device 101 switching/connecting to the MSO network 117 during a time when the MSO network 117 is experiencing an unfavorable network condition may degrade, alter, or otherwise impact a user experience associated with the user device 101. The user device 101 may preserve the user experience by using signals (e.g., broadcast (unicast/multicast) messages, beacons, etc.) from the MSO network 117 (e.g., the MSO eNb 116, etc.) that inform of the network condition as triggers to abort an attempt to connect/switch to the MSO network 117. The user device 101 may again attempt to connect/switch to the MSO network 117 based on a temporal condition, such as the expiration of a time duration, or during a specific time/time period. The temporal condition may be determined by the user device 101, a service/subscription parameter, and/or the MSO network 117 (e.g., a device/component of the MSO network 117, etc.). The MSO network 117 (e.g., a device/component of the MSO network 117, etc.) may send information that indicates a temporal condition along with signals that inform of the network condition. The user device 101 may again (or initially) attempt to connect/switch to the MSO network 117 (or any other network) based on a spatial condition, such as when the user device 101 leaves/enters a geo-fenced area (e.g., a home, etc.). The user device 101 may use any condition to determine when to attempt to reconnect to and/or connect to the MSO network 117. Although the process is described for connecting/switching to the MSO network 117, it should be appreciated that the same process may when connecting/switching the user device 101 to the MNO network 122 (or any other network).

The user device 101 may conserve its power and or resources when attempting to connect and/or reconnect to a network (e.g., switching between networks, etc.) by detecting/determining signals (e.g., broadcast (unicast/multicast) messages, beacons, handover and/or presence signals, etc.) from a network (e.g., a primary network, an offload network, the MSO network 117, the MNO network 122, etc.) based on a varying temporal element, such as a scanning duration and/or scanning periodicity. The scanning duration and/or scanning periodicity may be adjusted based on parameters/conditions affecting the user device 101 such as mobility estimation, device presence criteria/rules (e.g., whether the user device 101 is indoors or outdoors, etc.), geo-fencing criteria, battery/power consumption, and/or the like.

As described, the sensor module 114 may estimate/determine the mobility state of the user device 101. An estimation/determination of the mobility state of the user device 101 may cause the user device 101 to dynamically scale the scanning duration of the user device 101. A determination that the user device 101 is operating at a speed higher than a threshold be may cause the scanning (detection/determination) duration to decrease and/or increase a duration between scans by a pre-configured/determined factor. When the user device 101 is operating at a speed higher than the threshold, then the user device 101 may not scan for, detect, and/or determine signals (e.g., broadcast (unicast/multicast) messages, beacons, handover and/or presence signals, etc.) from a network (e.g., a primary network, an offload network, the MNO network 122, the MSO network 117, etc.) to which it is not connected to until a determination is made that the user device 101 is operating at speed lower than the threshold. The operational status of the user device may enable hysteresis of triggers that cause the user device 101 to connect to and/or switch between networks.

The user device 101 may use estimates of presence/localization (e.g., device indoors, device outdoors, etc.) of the user device 101 to dynamically scale the scanning (detection/determination) duration. For example, the user device 101 may be provisioned (e.g., pre-configured, over-the-air (OTA) configured, etc.) by a service provider associated with a network that prioritizes outdoor deployment to decrease the scanning duration and/or increase the duration between scans by a pre-configured factor (or stop scanning) when the user device 101 is indoors. The scanning duration may be adjusted based on other geo-fencing criteria. For example, the scanning duration may be adjusted or scanning may be ceased when the user device 101 is within a geo-fenced area. The user device 101 may adjust the periodicity of a scan based on geo-fencing criteria. For example, the user device 101 may dynamically change the scanning periodicity based on a proximity measure within the geo-fenced area, such as a measure of how close the user device 101 is to the centroid of the geo-fenced area. The scanning periodicity may change and/or be adjusted based on criteria for a plurality of geo-fenced areas to support geography-specific operator deployment design and densities in different parts of a network. The scanning duration and periodicity may be based on and/or determined by user device configurations, information received from a network (e.g., OTA provisioning from a network server/device/component, carrier application, etc.), and/or the like.

Other criteria and/or conditions may affect and/or be used to manage when the user device 101 transitions connection from a first network associated with subscription/service/provider to a second network associated with another subscription/service/provider. For example, whenever the user device 101 scans for (e.g., detects/determined, etc.) a network (e.g., the MNO network 123, the MSO network 117, etc.) to switch to according to preferred network settings, interruptions in communication and/or data reception may occur and impair an overall user experience. The user device 101 and/or a network (e.g., a preferred network, the MNO network 123, the MSO network 117, etc.) may be configured to assist in avoiding such interruptions by monitoring traffic patterns within the network, and taking advantage of opportunities to switch to the network when a user experience may be least impacted. For example, time-division multiplexed (TDM) patterns and/or frequency-division multiplexed (FDM) patterns between networks may inform of a dual subscriber identification module (SIM) dual standby (DSDS) or multi-SIM configuration of the user device 101. The user device 101 may send a signal, message, notification, and/or the like that informs the network (e.g., the MNO network 123, the MSO network 117, etc.) that the user device 101 is operating in a DSDS and/or multi-SIM mode. The user device 101 may request/recommend that the network provide a TDM pattern or an FDM pattern for operation. The network may provide the TDM pattern or the FDM pattern to be received by the user device 101 on the network and another network to which the user device is subscribed to and/or associated. The user device 101 may determine the TDM pattern or the FDM pattern and inform both networks of the desired TDM pattern or the desired FDM pattern. For example, the user device 101 may use traffic characteristics of an active data session to determine the pattern and inform both networks on the desired TDM pattern or the desired FDM pattern. A capability of the user device 101, such as a processing capability, a communication capability, an operational capability, and/or the like, may be used to determine TDM pattern and/or FDM pattern requirements that may be communicated to the networks. The determination of the TDM pattern and/or FDM pattern may be optimized according to factors such as a traffic profile of the active traffic on a data network and/or signal measurements/requirements. For example, measurements such as reference signal received power (RSRP), reference signal received quality (RSRQ), or any other signal measurement associated with a network may be used to determine the TDM pattern and/or FDM pattern requirements.

Figure 2:
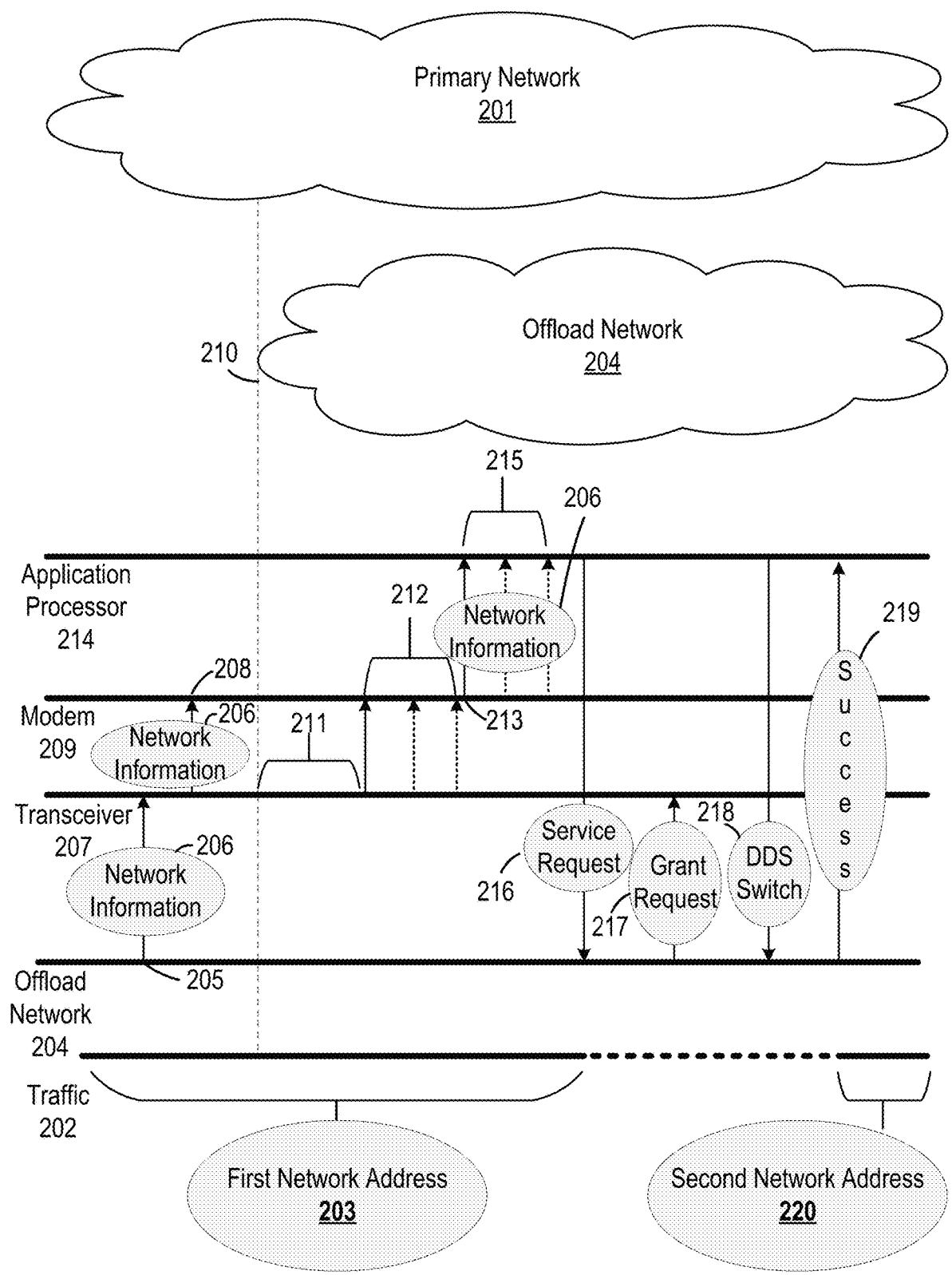
FIG. 2 is a diagram for switching between service provider networks.

FIG. 2 shows a diagram for switching between service provider networks. A user device (e.g., the user device 101, a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) may be optimized to avoid interruptions by using information relating to a network of the to abort a "hand-in" (e.g., a connection attempt, etc.) and switch the user device back to a primary network. For example, when the modem of the user device receives information relating to a network that indicates a network admission reject condition, the information may be sent from a modem to an application processor of the user device to inform the switching logic of the user device to abort the hand-in" (e.g., a connection attempt, etc.).

As shown, a user device may be connected to a primary network 201. The primary network 201 may support, facilitate, and/or be associated with voice services for the user device, and an offload network 204 may support, facilitate, and/or be associated with data service (e.g., a dedicated data subscription, etc.) for the user device. The primary network 201 may include a mobile network operator (MNO), a multi-system operator (MSO) network, or any other network. While connected to the primary network 201 the user device may transmit and/or be associated with traffic 202. Traffic 202 may include any type of data communication and may be communicated within the primary network 201 using a first network address 203 (e.g., an internet protocol (IP) address, etc.) associated with the primary network 201. The user device may be configured to incrementally tune its transceiver to various frequencies to scan and/or monitor for a signal that indicates the presence of an offload network 204. The user device may scan and/or monitor for the signal that indicates the presence of the offload network 204 according to a cycle, such as a defined duration and/or periodicity. For example, the user device may scan and/or monitor for the signal at every 2-millisecond interval for 1 millisecond. The cycle may be based on any duration and/or periodicity. While scanning and/or monitoring for the signal that indicates the presence of the offload network 204, at 205, the offload network 204 send/broadcast network information 206. The network information 206 may inform of a network condition affecting the offload network 204, such as congestion, overload, errors, and/or any other network condition. A transceiver 207 of the user device may receive the network information 206, and at 208, the network information 206 may be sent to a modem 209 of the user device.

At 210, the user device may detect one or more signals sent/broadcast by the offload network 204 (e.g., a base station of the offload network 204, etc.). The user device may determine that the one or more signals sent/broadcast by the offload network 204 (e.g., a base station of the offload network 204, etc.) are received for a duration 211. When the user device confirms that the one or more signals sent/broadcast by the offload network 204 are received for the duration 211, at 212 the user device may begin measuring the one or more signals to confirm that the one or more signals are sent/broadcast at a level (e.g., power level, etc.) that may confirm the presence of the offload network 204. For example, the one or more signals may be sent from the transceiver 207 to the modem 209 based on the one or more signals satisfying a threshold. At 213, once the one or more signals sent/broadcast by the offload network 204 are determined to indicate the presence of the offload network 204, the network information 206 may be sent to an application processor 214 of the user device. For example, a notification that the one or more signals sent/broadcast by the offload network 204 that indicate the presence of the offload network 204 satisfy the threshold and an indication of the network information 206 may be sent to the application processor 214. At 215, hysteresis may be used on the signals sent by the offload network 204 informing of the network information 206 to prevent any quick changes in the network switching logic of the user device due to noise, and/or errors in data reception. The application processor 214 may determine that the one or more signals sent/broadcast by the offload network 204 that indicate the presence of the offload network 204 received for a threshold duration.

The network information 206 may inform the user device that the offload network 204 is operating successfully (e.g., without errors, congestion, etc.) and may support connecting the user device to the offload network 204 without detriment to a user experience. The network information 206 may inform the user device that the operational status of the offload network 204 is degraded (e.g., traffic congestion, errors, overload, etc.) and may not support connecting the user device to the offload network 204 without detriment to the user experience. When/if the network information 206 informs the user device that the operational status of the offload network 204 is degraded, the user device may abort any attempt to switch/connect to the offload network 204.

The application processor 214, based on determining that the one or more signals sent/broadcast by the offload network 204 that indicate the presence of the offload network 204 are received by the user device for the threshold duration, and the network information 206 informing the user device that the offload network 204 is operating successfully (e.g., without errors, congestion, etc.), may cause a service request 216 to be sent to the offload network 204. At 217, the offload network 204 may grant the service request 216, and send an acknowledgment of the service request 216 that may be received by the transceiver 207. The acknowledgment of the service request 216 may be sent from the transceiver 207 to the application processor 214 and the application processor 214 may initiate network switching logic to disconnect the user device from the primary network 201 and connect the user device to the offload network 204.

At 218, the application processor may implement switching logic to cause the user device to switch from the primary network 201 to the offload network 204. The switch from the primary network 201 to the offload network 204 may cause a switch in services provided to the user device, such as a switch from voice-only services provided by the primary network 201 to a dedicated data subscription (DDS) service. The user device switching from voice-only services provided by the primary network 201 to a dedicated data subscription (DDS) service provided by the offload network 204 is indicated at 218. At 219, information indicating a successful connection to the offload network 204 may be communicated to the user device (e.g., the transceiver 207, the modem 209, the application processor 214, etc.). When the user device connects to the offload network 204, the traffic 202 communicated by and/or associated with the user device may be communicated within the offload network 204 using a second network address 220 (e.g., an internet protocol (IP) address, etc.) associated with offload network 204. Although components of the user device (e.g., the transceiver 207, the modem 209, the application processor 214, etc.) are described as performing certain actions/steps, it should be appreciated that any action/step performed by a component of the user device may be performed by any component of the user device.

Figure 3:
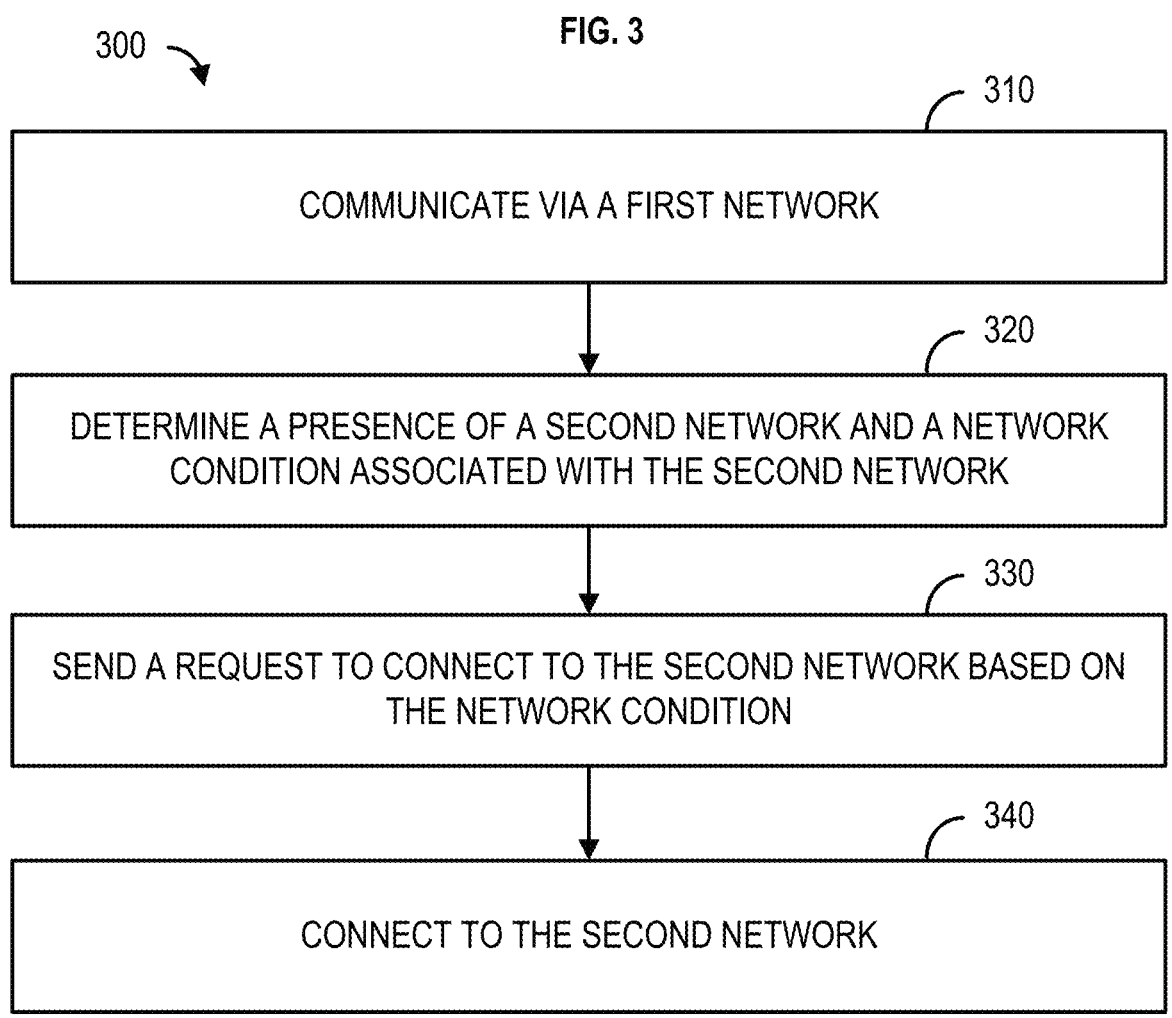
FIG. 3 shows a flowchart of a method for switching between service provider networks.

FIG. 3 shows a flowchart of a method 300 for switching between service providers. At 310, a user device (e.g., the user device 101, a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) may communicate via a first network. For example, the user device may be connected to the first network. The first network may be a network that supports/facilitates voice (e.g., telephony, etc.) communications and/or subscription services, such as a mobile network operator (MNO) network. The user device may be connected to the first network via a first network address. For example, communications within the first network may be associated with the first network address, such an IP address specific to the first network.

At 320, a presence of a second network and a network condition associated with the second network may be determined. For example, a signal (e.g., a broadcast (unicast/multicast) message, a beacon, etc.) that indicates the presence of the second network and the indication of the network condition of the second network may be received. from a network device and/or component of the second network. The second network may be a network that supports/facilitates data (e.g., multimedia, a dedicated data subscription, etc.) communications and/or subscription services, such as a multi-system operator (MSO) network. Communications within the first network may be associated with the first network address, such as an IP address specific to the first network. The user device may receive the signal that indicates the presence of a second network and an indication of a network condition of the second network via a transceiver of the user device. For example, the user device may tune the transceiver to a specific frequency, for a duration, to monitor for the signal that indicates the presence of a second network. The duration may be based on the mobility of the user device, an operational status of the user device, power consumption of the user device, device presence (e.g., user device indoor vs. outdoor, etc.), or geo-fencing information/parameters.

The signal that indicates the presence of the second network may be sent/broadcast by any device/component of the second network, such as a base station, access point, relay, node, and/or the like. An indication of a network condition of the second network may also be sent/broadcast by the device/component of the second network. For example, the second network may be congested, overloaded, and/or experiencing any other network condition. Alternatively, the second network may be operating free of errors, congestion, or any other issues that may detriment a user experience. The second network may periodically broadcast signals that indicate its network condition.

The signal that indicates the presence of the second network may be received for a threshold duration. The user device may determine that the signal that indicates the presence of the second network is received for the threshold duration. For example, an application processor of the user device may determine that the signal that indicates the presence of the second network is received for the threshold duration.

The signal that indicates the presence of the second network may be determined to satisfy a threshold. The user device may determine that the signal satisfies the threshold. For example, the user device may use signal measurements such as reference signal received power (RSRP), reference signal received quality (RSRQ), or any other signal measurement to determine that the signal satisfies the threshold. The threshold may be based on a threshold power level, a threshold amplitude, and/or the like. When the user device determines that the signal satisfies the threshold, a transceiver of the user device may inform a modem of the user device of the presence of the second network. A notification that the signal that indicates the presence of the second network satisfies the threshold and the indication of the network condition may be sent from the modem to an application processor of the user device.

At 330, a request to connect to the second network may be sent. The user device may send the request to connect to the second network based on the indication of the network condition of the second network. For example, the indication of the network condition may indicate that the second network has available bandwidth, is operating error free, and/or is not experiencing latency. The indication of the network condition may indicate any situation and/or condition associated with the second network. The user device may send the request to connect to the second network to a base station, access point, relay, node, and/or the like of the second network. The application processer of the user device may cause the modem to send the request to connect to the second network to the base station, access point, relay, node, and/or the like of the second network based on determining that the signal that indicates the presence of the second network is received for the threshold duration and the network condition.

At 340, the user device may connect to the second network. The user device may receive an acknowledgment of the request to connect to the second network from the base station, access point, relay, node, and/or the like of the second network. For example, the user device may receive the acknowledgment via the transceiver. The acknowledgment may be sent/forwarded from the transceiver to the application processor. The application processor may initiate a switch protocol to cause the user device to connect to the second network. Connecting to the second network may cause the user device to communicate with the second network via a second network address (e.g., an IP address associated with the second network, etc.). When the user device connects to the second network, the user device may also send a message to the first network, such as an 'Extended Service Request' message to inform the first network (e.g., inform a base station, network device, relay, access point, etc.) that the user device is disconnecting from the first network and connecting to the second network. In response to receiving the message from the user device. The first network may locally deactivate all data EPS bearers associated with the user device. Alternatively, the first network may suspend the data EPS bearers with a pre-configured timer value configured in the first network.

Figure 4:
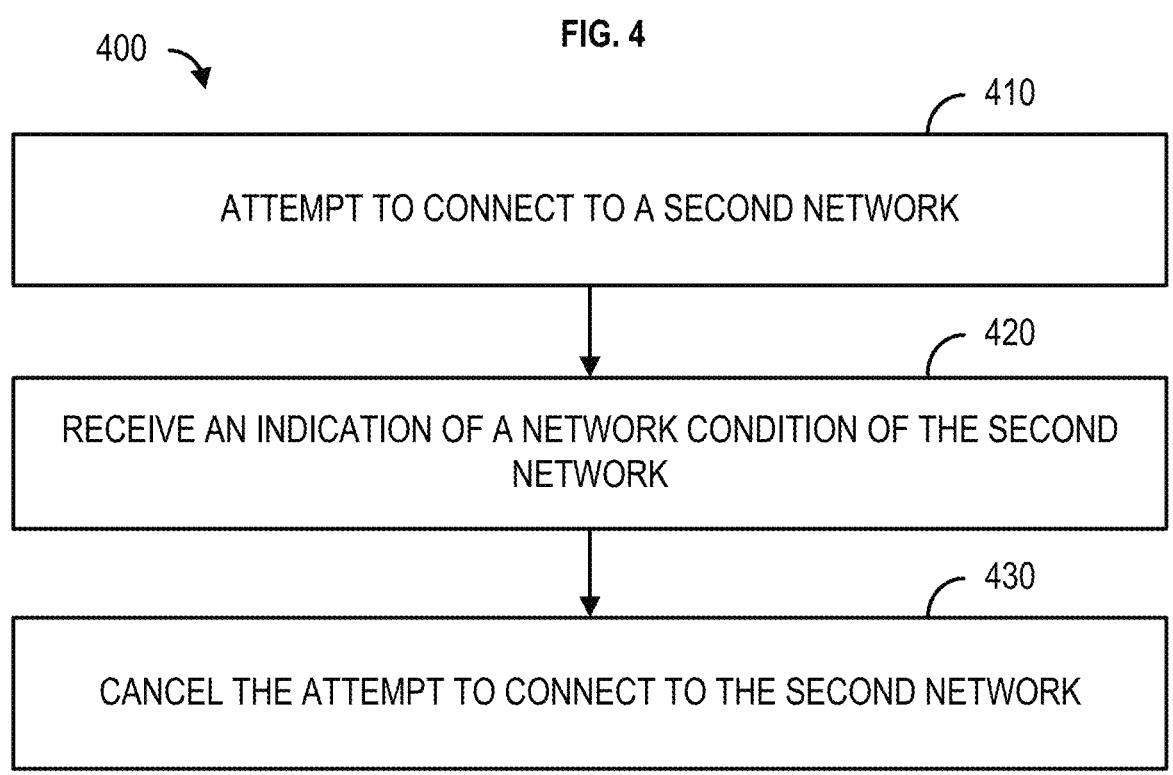
FIG. 4 shows a flowchart of a method for switching between service provider networks.

FIG. 4 shows a flowchart of a method 400 for switching between service providers. At 410, a user device (e.g., the user device 101, a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) communicating with and/or connected to a first network may attempt to connect to a second network. Communications within the first network may be associated with a first network address, such as an IP address specific to the first network. The first network may be a network that supports/facilitates voice (e.g., telephony, etc.) communications and/or subscription services, such as a mobile network operator (MNO) network. Communications within the first network may be associated with a first network address, such an IP address specific to the first network. The second network may be a network that supports/facilitates data (e.g., multimedia, a dedicated data subscription, etc.) communications and/or subscription services, such as a multi-system operator (MSO) network.

The user device may receive a signal (e.g., a broadcast (unicast/multicast) message, a beacon, etc.) that indicates the presence of a second network. The signal that indicates the presence of the second network may be sent/broadcast by a device/component of the second network, such as a base station, access point, relay, node, and/or the like. The user device may receive the signal that indicates the presence of a second network via a transceiver of the user device. For example, the user device may tune the transceiver to a specific frequency, for a duration, to monitor for the signal that indicates the presence of a second network. The duration may be based on the mobility of the user device, an operational status of the user device, power consumption of the user device, device presence (e.g., user device indoor vs. outdoor, etc.), or geo-fencing information/parameters.

The user device may determine that the signal that indicates the presence of the second network satisfies a threshold and/or is received for a threshold duration. For example, the user device may use signal measurements such as reference signal received power (RSRP), reference signal received quality (RSRQ), or any other signal measurement to determine that the signal satisfies the threshold. The threshold may be based on a threshold power level, a threshold amplitude, and/or the like. When the user device determines that the signal satisfies the threshold, a transceiver of the user device may inform a modem of the user device of the presence of the second network. A notification that the signal that indicates the presence of the second network satisfies the threshold and the indication of the network condition may be sent from the modem to an application processor of the user device. The signal that indicates the presence of the second network may be received for a threshold duration. The user device may determine that the signal that indicates the presence of the second network is received for the threshold duration. For example, an application processor of the user device may determine that the signal that indicates the presence of the second network is received for the threshold duration.

At 420, an indication of a network condition of the second network may be received. The indication of the network condition of the second network may be sent/broadcast by a device/component of the second network, such as a base station, access point, relay, node, and/or the like. For example, the second network may be congested, overloaded, and/or experiencing any other network condition. Alternatively, the second network may be operating free of errors, congestion, or any other issues that may detriment a user experience. The second network may periodically broadcast signals that indicate its network condition. The indication of the network condition of the second network may be sent along with the signal that indicates the presence of the second network.

At 450, the attempt to connect to the second network may be canceled. For example, based on the network condition, the user device may determine that a user experience may be impacted by the network condition of the second network. For example, an indication of congestion, and/or errors associated with the second network, may indicate that voice data, multimedia data, and/or the like may be impacted by data loss, connection timeouts, distorted images and/or sound, and/or the like if communicated via the second network. As such, the user device may determine to cancel any attempt to connect to the second network and remain connected to and/or in communication with the first network.

Figure 5:
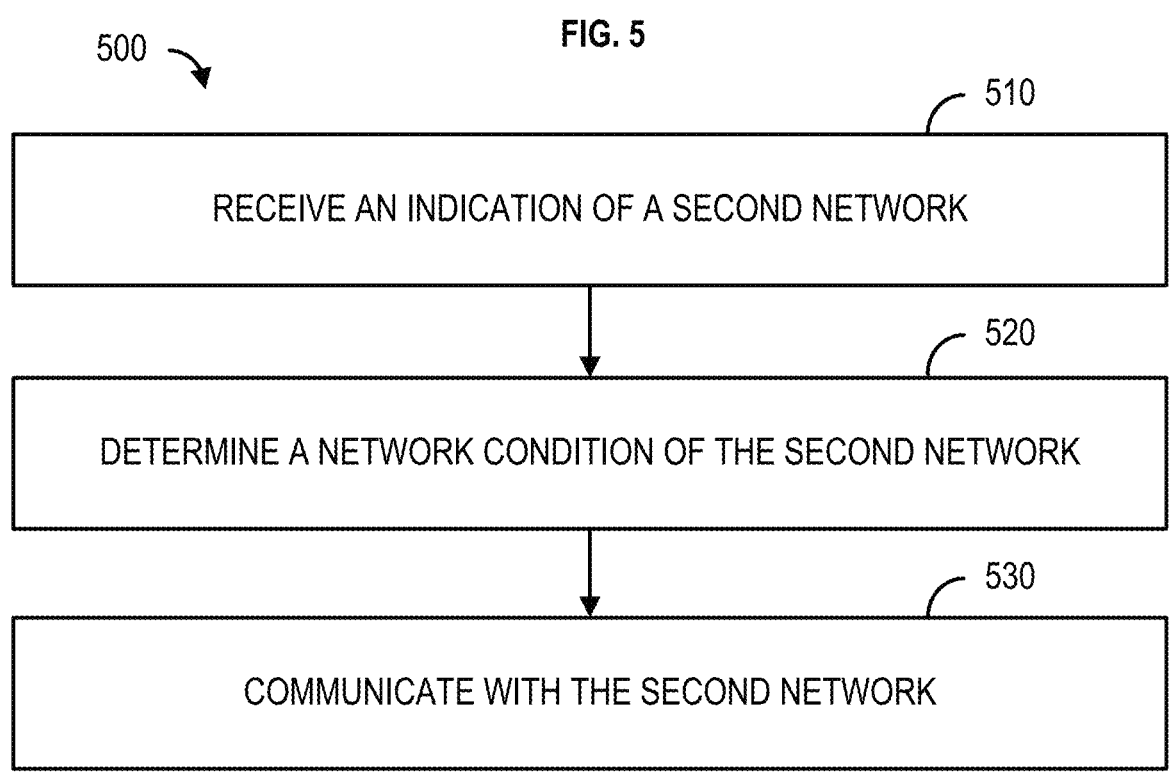
FIG. 5 shows a flowchart of a method for switching between service provider networks.

FIG. 5 shows a flowchart of a method 500 for switching between service providers. At 510, a user device (e.g., the user device 101, a mobile phone, user equipment (UE), a dual subscriber identity module (SIM) dual standby (DSDS) device, a multi-SIM multi-standby device (MSMS) device, a mobile device, a smart device, laptop, tablet, computing device, etc.) in communication with a first network may receive an indication of a second network. The first network may be a network that supports/facilitates voice (e.g., telephony, etc.) communications and/or subscription services, such as a mobile network operator (MNO) network. The second network may be a network that supports/facilitates data (e.g., multimedia, a dedicated data subscription, etc.) communications and/or subscription services, such as a multi-system operator (MSO) network.

The user device may be connected to the first network via a first network address. For example, communications within the first network may be associated with the first network address, such an IP address specific to the first network. The indication of the second may be based on a signal (e.g., a broadcast (unicast/multicast) message, a beacon, etc.) that indicates the presence of the second network. The indication of the second may be received from a network device and/or component of the second network. For example, the user device may tune the transceiver to a specific frequency, for a duration, to monitor for the signal that indicates the presence of a second network. The duration may be based on the mobility of the user device, an operational status of the user device, power consumption of the user device, device presence (e.g., user device indoor vs. outdoor, etc.), or geo-fencing information/parameters. The signal that indicates the presence of the second network may be sent/broadcast by any device/component of the second network, such as a base station, access point, relay, node, and/or the like.

At 520, a network condition of the second network may be determined. An indication of a network condition of the second network may be received with the indication of the presence of the second network. The indication of the network condition may be sent/broadcast by the device/component of the second network. The network condition may be that the second network is congested, overloaded, and/or experiencing any other network condition. Alternatively, the second network may be operating free of errors, congestion, or any other issues that may detriment a user experience. The second network may periodically broadcast signals that indicate its network condition.

The signal that indicates the presence of the second network may be received for a threshold duration. The user device may determine that the signal that indicates the presence of the second network is received for the threshold duration. For example, an application processor of the user device may determine that the signal that indicates the presence of the second network is received for the threshold duration.

The signal that indicates the presence of the second network may be determined to satisfy a threshold. The user device may determine that the signal satisfies the threshold. For example, the user device may use signal measurements such as reference signal received power (RSRP), reference signal received quality (RSRQ), or any other signal measurement to determine that the signal satisfies the threshold. The threshold may be based on a threshold power level, a threshold amplitude, and/or the like. When the user device determines that the signal satisfies the threshold, a transceiver of the user device may inform a modem of the user device of the presence of the second network. A notification that the signal that indicates the presence of the second network satisfies the threshold and the indication of the network condition may be sent from the modem to an application processor of the user device.

At 530, the user device may communicate with the second network. For example, the user device may send a request to connect to the second network based on the indication of the network condition of the second network. For example, the indication of the network condition may indicate that the second network has available bandwidth, is operating error free, and/or is not experiencing latency. The indication of the network condition may indicate any situation and/or condition associated with the second network. The user device may send the request to connect to the second network to a base station, access point, relay, node, and/or the like of the second network. The application processer of the user device may cause the modem to send the request to connect to the second network to the base station, access point, relay, node, and/or the like of the second network based on determining that the signal that indicates the presence of the second network is received for the threshold duration and the network condition.

The user device may receive an acknowledgment of the request to connect to the second network from the base station, access point, relay, node, and/or the like of the second network. For example, the user device may receive the acknowledgment via the transceiver. The acknowledgment may be sent/forwarded from the transceiver to the application processor. The application processor may initiate a switch protocol to cause the user device to connect to the second network. Connecting to the second network may cause the user device to communicate with the second network via a second network address (e.g., an IP address associated with the second network, etc.). When the user device connects to the second network, the user device may also send a message to the first network, such as an 'Extended Service Request' message to inform the first network (e.g., inform a base station, network device, relay, access point, etc.) that the user device is disconnecting from the first network and connecting to the second network. In response to receiving the message from the user device. The first network may locally deactivate all data EPS bearers associated with the user device. Alternatively, the first network may suspend the data EPS bearers with a preconfigured timer value configured in the first network.

Figure 6:
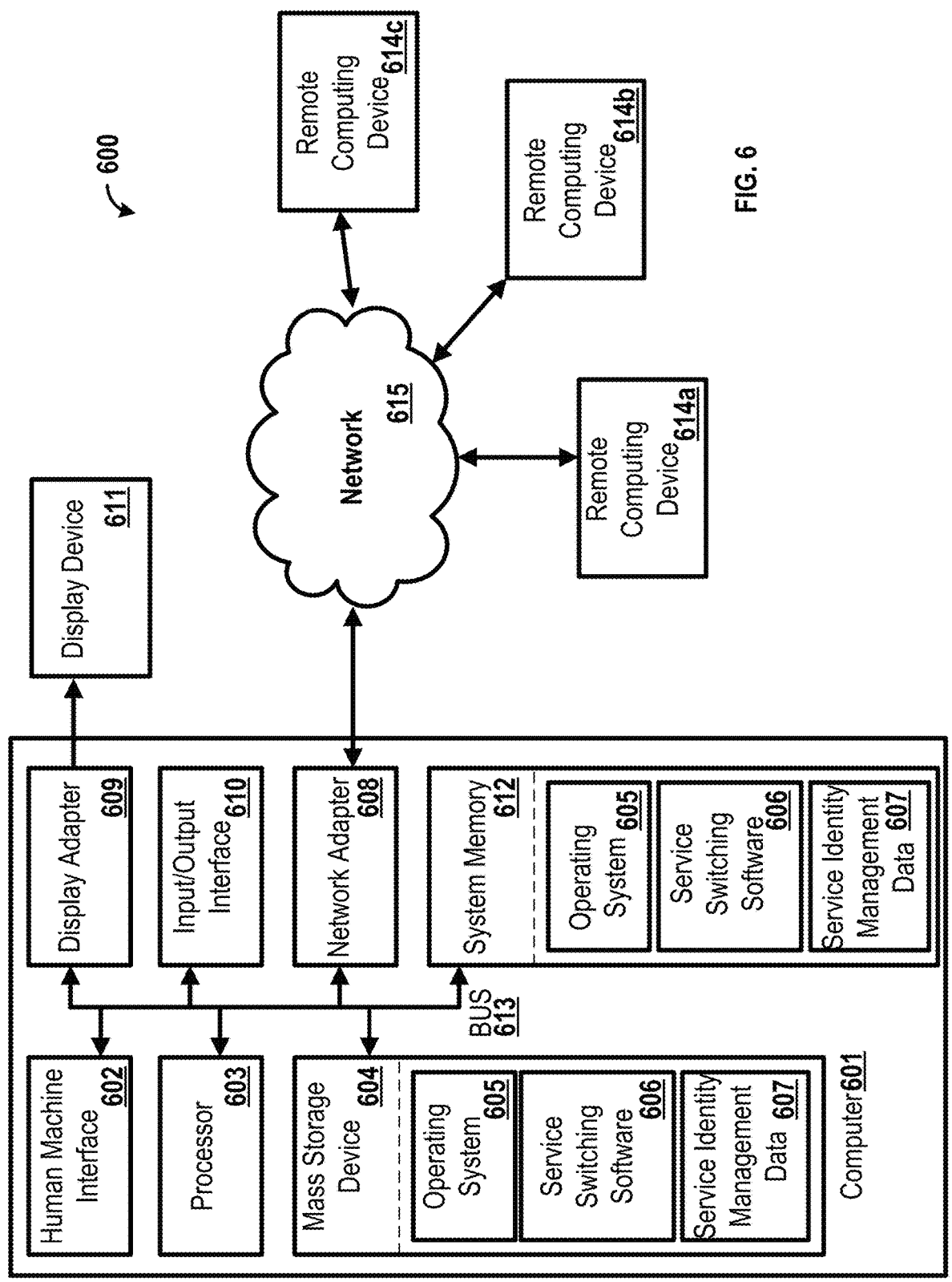
FIG. 6 shows a block diagram of a computing device for implementing service provider network switching.

FIG. 6 shows a computer 601. Any device/component described herein may be or may comprise a computer 601 as shown in FIG. 6.

The computer 601 may comprise one or more processors 603, a system memory 612, and a bus 613 that couples various components of the computer 601 including the one or more processors 603 to the system memory 612. In the case of multiple processors 603, the computer 601 may utilize parallel computing.

The bus 613 may comprise one or more of several possible types of bus structures, such as a memory bus, memory controller, a peripheral bus, an accelerated graphics port, and a processor or local bus using any of a variety of bus architectures.

The computer 601 may operate on and/or comprise a variety of computer-readable media (e.g., non-transitory). Computer-readable media may be any available media that is accessible by the computer 601 and comprises, non-transitory, volatile and/or non-volatile media, removable and non-removable media. The system memory 612 has computer-readable media in the form of volatile memory, such as random access memory (RAM), and/or non-volatile memory, such as read-only memory (ROM). The system memory 612 may store data such as service identity management data 607 and/or program modules such as operating system 605 and service switching software 606 that are accessible to and/or are operated on by the one or more processors 603.

The computer 601 may also comprise other removable/non-removable, volatile/non-volatile computer storage media. The mass storage device 604 may provide non-volatile storage of computer code, computer-readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 604. An operating system 605 and service switching software 606 may be stored on the mass storage device 604. One or more of the operating system 605 and service switching software 606 (or some combination thereof) may comprise program modules and the service switching software 606. Service identity management data 607 may also be stored on the mass storage device 604. Service identity management data 607 may be stored in any of one or more databases known in the art. The databases may be centralized or distributed across multiple locations within the network 615.

A user may enter commands and information into the computer 601 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human-machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

A display device 611 may also be connected to the bus 613 via an interface, such as a display adapter 609. It is contemplated that the computer 601 may have more than one display adapter 609 and the computer 601 may have more than one display device 611. A display device 611 may be a monitor, an LCD (Liquid Crystal Display), a light-emitting diode (LED) display, a television, smart lens, smart glass, and/or a projector. In addition to the display device 611, other output peripheral devices may comprise components such as speakers (not shown) and a printer (not shown) which may be connected to the computer 601 via Input/Output Interface 610. Any step and/or result of the methods may be output (or caused to be output) in any form to an output device. Such output may be any form of visual representation, including, but not limited to, textual, graphical, animation, audio, tactile, and the like. The display 611 and computer 601 may be part of one device, or separate devices.

The computer 601 may operate in a networked environment using logical connections to one or more remote computing devices 614a,b,c. A remote computing device 614a,b,c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 601 and a remote computing device 614a,b,c may be made via a network 615, such as a local area network (LAN) and/or a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components may reside at various times in different storage components of the computing device 601, and are executed by the one or more processors 603 of the computer 601. An implementation of service switching software 606 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   causing, by a user device, a connection with a first network, wherein the first network is configured to provide a first service type;
   determining a presence of a second network for a duration of time and a network condition associated with the second network, wherein the second network is configured to provide a second service type;
   sending, based on the network condition and based on the first service type of the first network and the second service type of the second network, a request to connect to the second network; and
   causing, based on an acknowledgment of the request, a connection with the second network.

2. The method of claim 1, wherein the user device comprises one or more of a dual subscriber identification module (SIM) dual standby (DSDS) device, or a multi-SIM device.

3. The method of claim 1, wherein the first service type comprises one or more of a voice service or a cellular service.

4. The method of claim 1, wherein the second service type comprises one or more of a multimedia service or an internet service.

5. The method of claim 1, wherein the network condition comprises one or more of network congestion, network overload, network errors, network latency, or network traffic conditions.

6. The method of claim 1, further comprising sending a request to the first network to suspend the connection with the first network.

7. The method of claim 6, further comprising tuning, for a time period, a transceiver of the user device to monitor for a signal associated with the second network.

8. The method of claim 7, wherein the time period is based on at least one of an operational status of the user device, power consumption of the user device, or geofencing information.

9. The method of claim 1, further comprising sending, from a transceiver of the user device to a modem of the user device, based on a signal associated with the second network, an indication of the presence of the second network.

10. The method of claim 1, further comprising sending, from a modem of the user device to an application processor of the user device, a notification that a signal associated with the second network is received for the duration of time and an indication of the network condition.

11. The method of claim 1, further comprising determining, by an application processor of the user device, that a signal associated with the second network is received for the duration of time.

12. The method of claim 1, further comprising receiving from the second network, via a transceiver of the user device, the acknowledgment of the request to connect to the second network.

13. The method of claim 12, further comprising sending from a modem of the user device to an application processor of the user device, the acknowledgment of the request to connect to the second network.

14. The method of claim 1, wherein determining the presence of the second network for the duration of time and the network condition associated with the second network comprises determining, based on a signal associated with the second network being received for the duration of time, the presence of the second network and the network condition associated with the second network.

15. The method of claim 1, wherein determining the presence of the second network and the network condition associated with the second network comprises determining an indication of the presence of the second network and the network condition associated with the second network.

16. A method comprising:
    causing, by a computing device, output of a signal associated with a first network that is configured to provide a first service type, wherein a user device receives the signal while the user device is connected to a second network that is configured to provide a second service type;
    receiving a request to connect to the first network, wherein the user device sends the request based on determining a presence of the first network for a duration of time and a network condition associated with the first network and based on the first service type of the first network and the second service type of the second network; and
    causing, based on the request, the user device to connect to the first network.

17. The method of claim 16, wherein the first service type comprises one or more of a multimedia service or an internet service.

18. The method of claim 16, wherein the user device comprises at least one of a dual subscriber identification module (SIM) dual standby (DSDS) device, or a multi-SIM device.

19. The method of claim 16, wherein the second service type comprises one or more of a voice service or a cellular service.

20. The method of claim 16, wherein the network condition comprises one or more of network congestion, network overload, network errors, network latency, or network traffic conditions.

21. The method of claim 16, wherein the user device communicates with the second network via a transceiver of the user device.

22. The method of claim 21, wherein the user device tunes, for a time period, the transceiver to monitor for the signal.

23. The method of claim 16, wherein the user device sends, from a transceiver of the user device to a modem of the user device, based on the signal being received for the duration of time, an indication of the presence of the first network.

24. The method of claim 23, wherein the user device sends, from the modem to an application processor of the user device, a notification that the signal is received for the duration of time and the indication of the network condition.

25. The method of claim 16, wherein an application processor of the user device determines that the signal is received for the duration of time.

26. A method comprising:
    receiving, by a user device in communication with a first network, a signal associated with a second network, wherein the first network is configured to provide a first service type, and wherein the second network is configured to provide a second service type;
    determining, based on receiving the signal for a duration of time, an indication of the second network;
    determining, based on the indication of the second network, a network condition of the second network; and causing, based on the network condition and based on the first service type of the first network and the second service type of the second network, the user device to communicate with the second network.

27. The method of claim 26, wherein the user device comprises one or more of a dual subscriber identification module (SIM) dual standby (DSDS) device, or a multi-SIM device.

28. The method of claim 26, wherein the first service type comprises one or more of a voice service or a cellular service.

29. The method of claim 26, wherein the second service type comprises one or more of a multimedia service or an internet service.

30. The method of claim 26, wherein the network condition comprises one or more of network congestion, network overload, network errors, network latency, or network traffic conditions.

31. The method of claim 26, wherein the user device is configured to connect to the second network as a primary network connection and connect to the first network as an offload network connection.

\* \* \* \* \*